June 25, 1963 M. WILLIAMS 3,095,319

MANUFACTURE OF APPARATUSES INCLUDING THIN MAGNETIC FILMS

Filed May 26, 1959

INVENTOR
MICHAEL WILLIAMS
BY Kirschstein, Kirschstein & Ottinger
ATTORNEYS

United States Patent Office 3,095,319
Patented June 25, 1963

3,095,319
MANUFACTURE OF APPARATUSES INCLUDING THIN MAGNETIC FILMS
Michael Williams, Watford, England, assignor to The General Electric Company Limited, London, England
Filed May 26, 1959, Ser. No. 816,007
Claims priority, application Great Britain May 28, 1958
3 Claims. (Cl. 117—107)

Figure 1:
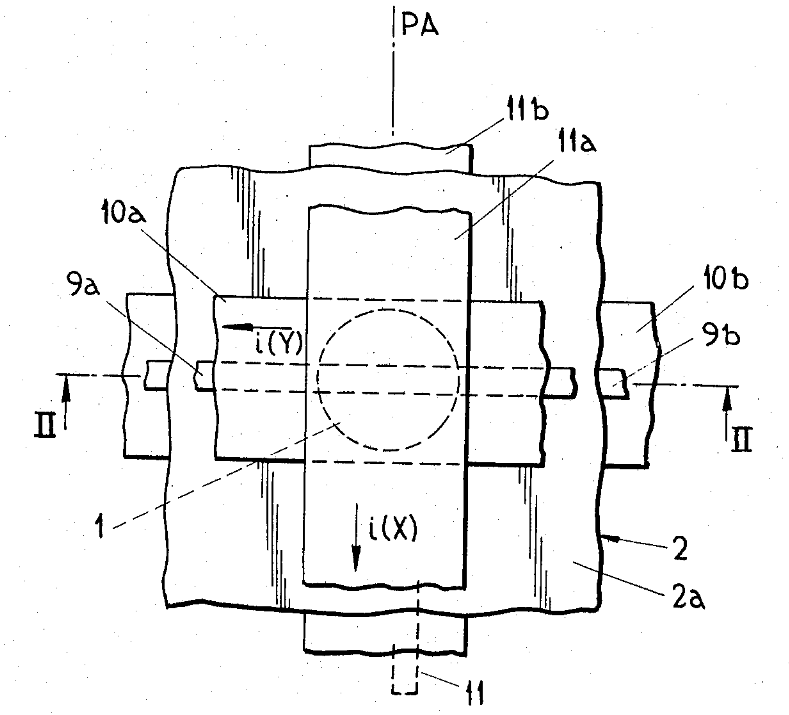

The present invention relates to methods of manufacturing apparatuses including thin films of ferromagnetic material.

Sufficiently thin films of ferromagnetic material have been found to exhibit uniaxial anisotropy so that for any such film there is a so-called "preferred axis" of magnetization which lies within the film, this preferred axis being an axis parallel to which any magnetization of the film lies in the absence of an external field. The preferred axis is sometimes referred to as the "easy axis," and the magnitude of the magnetic field required to effect a given rotation of the magnetization from this axis is dependent upon the degree of anisotropy. The degree of anisotropy is believed to be determined by the amount of atomic ordering parallel to the preferred axis within the film.

For a cyclic variation in magnetizing field applied parallel to the preferred axis of such a film, the resulting variation in the magnetization of the film measured parallel to that preferred axis may be represented by a hysteresis loop which shows that there are two stable states of magnetization of the film, that is, two states in which there is magnetization of the film in the absence of an external field. The magnitude of the magnetization of the film is the same in both of these states, but of opposite sense along the preferred axis.

A film of this kind is referred to herein as a "magnetic thin film."

In view of the existence of the two stable states of magnetization it has been proposed to use a magnetic thin film as a bistable device to store binary data. Such a bistable device may be switched from one to the other of its two stable states by the application of a magnetic field to cause a reversal of the direction of magnetization along the preferred axis by rotation of that magnetization.

In the manufacture of apparatus (such as a bistable device) including a magnetic thin film, it is desirable to arrange that the film shall have, to within specified limits, a predetermined degree of anisotropy. In a bistable device this predetermined degree of anisotropy is normally required to be small in order that the magnitude of the magnetic field required to switch the film from one stable state to the other shall be small also.

The degree of anisotropy of a magnetic thin film is often found to be undesirably high so it is desirable to have, and it is an object of the present invention to provide, a manufacturing method in which a magnetic thin having a suitably low degree of anisotropy is obtained.

According to the present invention, in a method of manufacturing apparatus including a magnetic thin film, a magnetic field is applied to the ferromagnetic material of the film, this field having at least a component which rotates in the plane of the film and being applied to the ferromagnetic material so that there is a consequent reduced degree of anisotropy.

Where this step of reducing the degree of anistropy of a magnetic thin film is utilized during the formation of that film the reduction in the degree of anisotropy thereby obtained is of course the difference between what it would have been but for this step, and that which actually obtains after the formation of that film.

Figure 2:
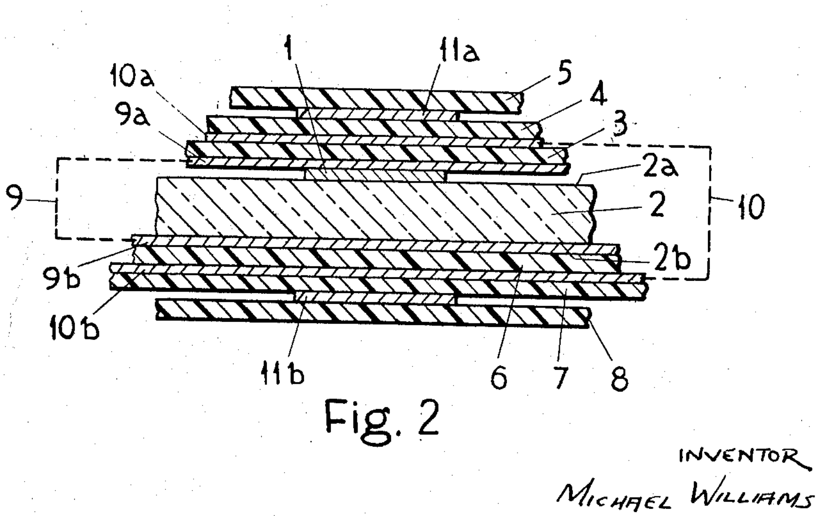

A method in accordance with the present invention for manufacturing a bistable device including a magnetic thin film will now be described, by way of example, with reference to the accompanying drawing, in which:

FIGURE 1 is a plan view, partly broken away, of the bistable device, this view illustrating the arrangement of the magnetic thin film and its associated electrodes in that device; and FIGURE 2 is a sectional elevation of the device, the section of this figure corresponding to a section taken on the line II—II of FIGURE 1.

The bistable device shown in FIGURES 1 and 2 is the same as that described in the present applicant's U.S. Patent No. 3,058,099, issued October 9, 1962.

Referring to FIGURES 1 and 2, the bistable device includes a thin film 1 of ferromagnetic material which is deposited by evaporation upon a smooth surface 2*a* of a glass base-member 2. The film 1 has a diameter of 5 millimetres and a thickness of 1,000 Angstrom units, and has a preferred axis of magnetization along an axis PA. There are two stable states of magnetization parallel to the axis PA in the film 1 in the absence of an external magnetic field in either direction along that axis. These two stable states are referred to as the state "0" and the state "1" respectively.

Three printed circuit boards 3, 4 and 5 lie one upon the other over the film 1 on the surface 2*a*. In a similar manner, three further printed circuit boards 6, 7 and 8 lie one upon the other over the opposite surface, surface 2*b*, of the glass base-member 2. The boards 3, 4, 6 and 7 carry copper electrodes 9*a*, 10*a*, 9*b* and 10*b* respectively, which lie perpendicular to the axis PA, and the boards 5 and 8 carry copper electrodes 11*a* and 11*b* respectively, which lie parallel to the axis PA. The boards 3 to 8 are omitted from FIGURE 1 to show clearly the disposition of the electrodes 9*a* to 11*a* and 9*b* to 10*b* with respect to the film 1.

The electrodes 9*a* and 10*a* are electrically connected to the corresponding electrodes 9*b* and 10*b* at opposite ends of the base-member 2, the interconnected pair of electrodes 9*a* and 9*b* forming a pick-up conductor 9, and the interconnected pair of electrodes 10*a* and 10*b* forming a drive conductor 10. The electrodes 11*a* and 11*b* are similarly interconnected to form a further drive conductor 11. Currents, as indicated by the arrows *i*(Y) and *i*(X), are caused to flow in the conductors 10 and 11 during operation to effect switching of the device.

In the manufacture of the bistable device described above, a clean slip of glass which forms the base-member 2 is positioned within an evacuated chamber containinga coiled electrical heating filament of tungsten. A thin film of an alloy of 82% nickel and 18% iron is deposited over the surface 2*a* of the base-member 2 by evaporation from the heating filament, the thickness of this film being 1,000 Angstrom units. The evaporation of the alloy is performed so that it is deposited normally to the surface 2*a*. During this process the base-member 2 is maintained at a temperature of 350° C.

In addition, a magnetic field is applied across the surface 2*a* so that the direction of this field rotates in the plane of that surface during the formation of the film. In the present case this rotating field is provided by two pairs of coils, the coils of each pair being placed opposite one another across the glass base-member 2 with their axes colinear and perpendicular to the axes of the other pair of coils. The arrangement of the coils in each pair is such that the passage of current through those coils produces a substantially uniform magnetic field in the plane of the surface 2*a*.

The nickel-iron alloy film is deposited upon the surface 2*a* by evaporating a length of wire formed of that alloy from within the coiled filament, the temperature of this filament being raised by controlling the magnitude of the heating current until the wire is observed to be on the point of melting (this normally occurs at a temperature of about 1500° C.). The temperature of the filament is now very rapidly increased so that the nickel-iron is completely evaporated within five to ten seconds. The thickness of the resulting film is of course dependent upon the actual mass of nickel-iron alloy evaporated.

Throughout the evaporation process alternating current is applied to the pairs of coils, the current applied to each pair of coils being in phase quadrature with that applied to the other pair so that the direction of the combined magnetic field due to these coils rotates in the plane of the film. The speed of rotation of this field is of course dependent upon the frequency of the alternating currents applied to the coils, the frequency in the present case being 50 cycles per second. The magnitude of the field applied to the film during formation is approximately 100 oersteds.

If the rotating field was not applied to the film during formation, that film would be found in general to have a preferred axis of magnetization lying in the plane of that film. It is believed that the existence of this preferred axis is due to atomic ordering within the film during its formation, the more pronounced this ordering the greater the preference for this direction of magnetization and the greater the degree of anisotropy. The application of the rotating field to the film on the other hand affects the atomic ordering causing the axis along which the atoms tends to become ordered to rotate so fast that the rate of atomic diffusion within the film is insufficient to allow the atoms of the film to remain ordered about that rotating axis. If then the magnetic field is rotated with sufficient speed in the plane of the film for as long as the temperature of that film is sufficient for sensible atomic diffusion, the film will have no substantial preferred axis of magnetization.

In the present case it is desired that the film shall have a small degree of anisotropy, and that the resulting preferred axis shall be parallel to a reference edge of the base-member 2. This is effected by applying to the film a magnetic field having a direction parallel to the reference edge and a magnitude sufficient to provide the necessary atomic ordering parallel to that edge. The field may be applied to the film either during the actual formation of that film or after the complete film has been formed. For example this field may be applied along the desired axis PA by arranging that the axis of one of the two pairs of coils lies along that axis PA and that the amplitude of the field produced by this pair is greater than that produced by the other. In this latter case the resultant magnetic field applied to the film by the two pairs of coils may be considered as having two components one of which is of constant magnitude and rotates in the plane of the film, and the other of which varies in magnitude and sense along an axis which thereby becomes the preferred axis PA of the film.

After the required orientation of the preferred axis PA together with the desired degree of anisotropy has been obtained, the base-member 2 is allowed to cool and removed from the evaporation chamber. The alloy film is now photo-etched to leave only the required circular pattern of the magnetic thin film 1 upon the surface 2*a*.

The printed circuit boards 3 to 8 are now placed in the appropriate order above and below the film 1, and the interconnection between the pairs of electrodes carried by those boards made. The correct orientation of the electrodes 9*a* to 11*a* and 9*b* to 11*b* with respect to the axis PA is effected from the reference edge of the base-member 2. The electrodes 9*a* to 11*a* and 9*b* to 11*b* are formed upon the boards 3 to 8 by a normal printed circuit technique.

The chamber within which the evaporation of the nickel-iron alloy takes place in the manufacture of the bistable magnetic device is evacuated by an oil diffusion pump down to a pressure corresponding to 0.1 micron of mercury. Grease, trapped gas, or moisture may result in contamination during the evaporation process, so the chamber is cleaned during evacuation by ionic bombardment which involves the striking of a discharge between two electrodes within that chamber when the pressure therein has been reduced to approximately that corresponding to 1 micron of mercury.

The above-described method of manufacturing the bistable device disclosed in the present applicant's U.S. Patent No. 3,058,099 may be applied also to the manufacture of a data store in which the five thousand two hundred magnetic thin films of that store are etched from a nickel-iron alloy film deposition by evaporation upon one surface of a glass base-member. The correct orientation of the preferred axis with respect to a reference edge of the base-member and the desired degree of anisotropy is first obtained for the alloy film as a whole in the manner described above in connection with the bistable device. The etching process is then performed, the alloy film being etched away to leave the required magnetic thin films arranged in rows and columns with their preferred axes aligned along the lengths of the columns.

Instead of using an evaporation process to deposit the film of ferromagnetic material any other incremental depositing method, such as electro-deposition, may be used.

I claim:

1. A method of manufacturing a uniaxially anisotropic magnetic thin film having a preferred axis of magnetization, said method comprising a step of heating a non-ferromagnetic base-member that has a planar face, a step of submitting the heated base-member to a magnetic field that has two components, one of which is stationary with respect to the base-member, and the other of which rotates in the plane of said face, and a third step of evaporating a body of ferromagnetic nickel-iron alloy to condense as a thin film on the heated base-member in the presence of the magnetic field.

2. In a method of manufacturing a uniaxially anisotropic magnetic thin film in which method a thin magnetic film of a magnetic metal is formed by incrementally depositing magnetic metal on a non-ferromagnetic base-member in the presence of a magnetic field acting in the film along an axis that is stationary relative to the base-member thereby to set said axis as a preferred axis of magnetization: that improvement comprising the step of submitting the film during its formation to a magnetic field that rotates relative to the base-member in the plane of the film so as to effect a reduction in the degree of uniaxial magnetic anisotropy of the film.

3. A method of manufacturing a uniaxially anisotropic magnetic thin film having a preferred axis of magnetization, comprising a first step of heating a nonferromagnetic base-member to a temperature of about 350° C., a second step of evaporating a mass of a ferromagnetic alloy comprising nickel and iron, to deposit as a coherent magnetic thin film upon the base-member, a third step of submitting the film during its deposition to two magnetic field components one of which rotates in the film relative to the base-member and the other of which acts in the film along an axis that is stationary relative to the base-member.

References Cited in the file of this patent

UNITED STATES PATENTS

| | | |
|---|---|---|
| 2,418,479 | Pratt et al. | Apr. 8, 1947 |
| 2,792,563 | Rajchman | May 14, 1957 |
| 2,853,402 | Blois | Sept. 23, 1958 |
| 2,900,282 | Rubens | Aug. 18, 1959 |
| 2,906,682 | Fahnoe et al. | Sept. 29, 1959 |

FOREIGN PATENTS

| | | |
|---|---|---|
| 572,409 | Great Britain | Oct. 8, 1945 |

OTHER REFERENCES

Stuijts et al.: "Crystal-Oriented Ferroxplana," Philips Technical Review, vol. 19, 1957–58, Nos. 7–8, pp. 209–217, February 10, 1958.